(No Model.) 2 Sheets—Sheet 1.
E. A. OVENSHIRE.
POLE ATTACHMENT FOR VARIOUS IMPLEMENTS.
No. 496,892. Patented May 9, 1893.
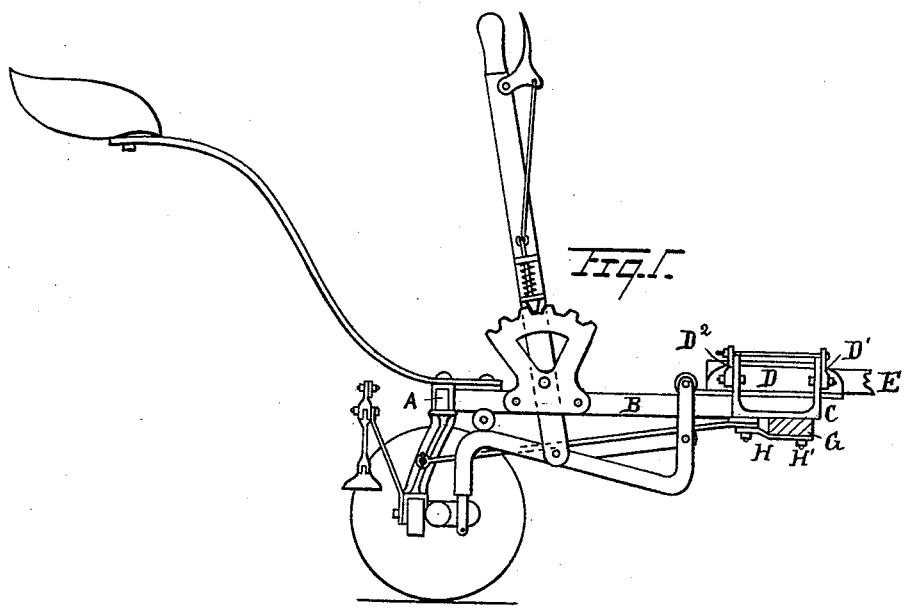
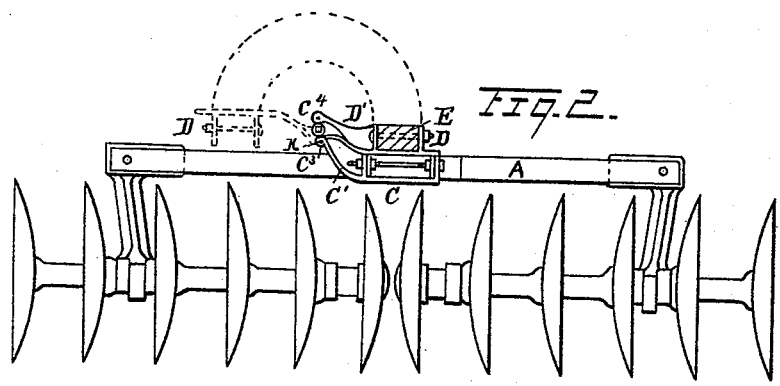
Witnesses
John Schuman.
John F. Miller
Inventor
Elijah A. Ovenshire
By Attorney
Newell S. Wright.
THE NORRIS PETERS CO., PHOTO-LITHO., WASHINGTON, D. C.

(No Model.) 2 Sheets—Sheet 2.

E. A. OVENSHIRE.
POLE ATTACHMENT FOR VARIOUS IMPLEMENTS.

No. 496,892. Patented May 9, 1893.

Witnesses
John Schuman
John F. Miller

Inventor
Elijah A. Ovenshire
By Attorney
Newell S. Wright

UNITED STATES PATENT OFFICE.

ELIJAH A. OVENSHIRE, OF DETROIT, MICHIGAN, ASSIGNOR TO THE AMERICAN HARROW COMPANY, OF SAME PLACE.

POLE ATTACHMENT FOR VARIOUS IMPLEMENTS.

SPECIFICATION forming part of Letters Patent No. 496,892, dated May 9, 1893.

Application filed December 31, 1892. Serial No. 456,970. (No model.)

*To all whom it may concern:*

Be it known that I, ELIJAH A. OVENSHIRE, a citizen of the United States, residing at Detroit, county of Wayne, State of Michigan, have invented a certain new and useful Improvement in a Pole Attachment for Various Implements; and I declare the following to be a full, clear, and exact description of the invention, such as will enable others skilled in the art to which it appertains to make and use the same, reference being had to the accompanying drawings, which form a part of this specification.

My invention has for its object a novel pole attachment for a variety of implements and vehicles, such as harrows or cultivators, harvesters, mowers and analogous devices or machines.

The purpose of my invention relates more especially to the provision of the pole attachment for various implements, vehicles and the like, whereby an attachment may readily be made where two horses are employed or engaged with the pole and which may be quickly and easily shifted for an attachment of three horses to the implement or vehicle.

To this end my invention consists of the construction, combination and arrangement of devices and appliances hereinafter specified and claimed and illustrated in the accompanying drawings, in which—

Figure 3:
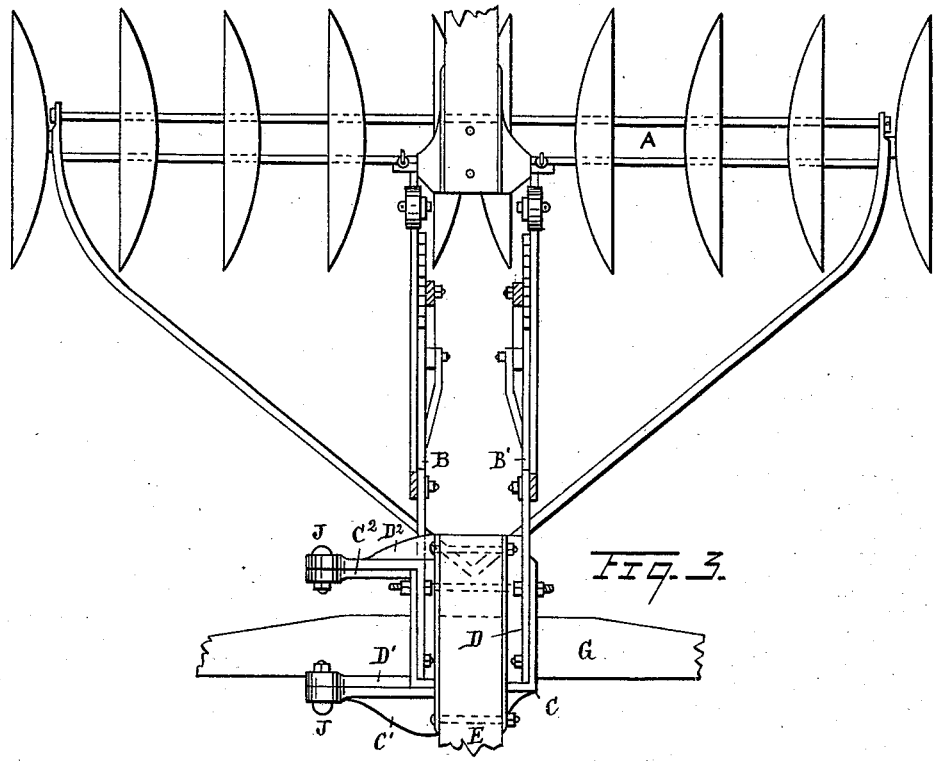
Figure 4:
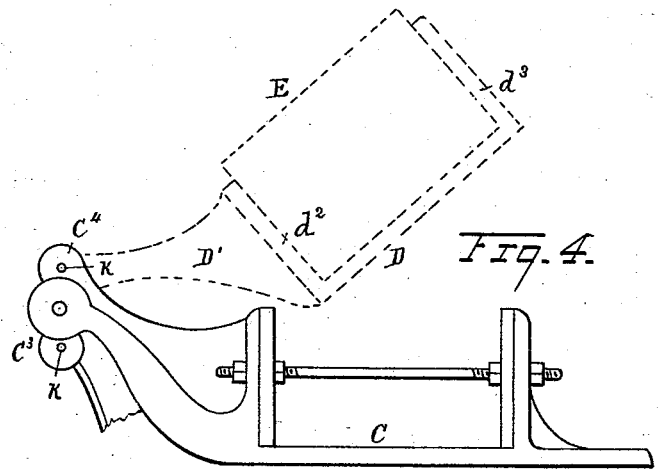

Figure 1 is a side elevation of said attachment. Fig. 2 is a front elevation of said attachment. Fig. 3 is a plan view showing my improved pole attachment, in engagement with a disk harrow. Fig. 4 is a separate view of the evener plate.

I will describe my invention as applied to a disk harrow, although I would have it clearly understood that I do not limit its application to any given machine, implement or vehicle, inasmuch as it is adapted for a variety of implements, as above stated, but I contemplate the application of said attachment to any machine to which it may be found applicable, as coming within the scope of my invention.

I carry out my invention as follows: A represents a disk harrow frame, provided with forwardly extended bars B, B', to the forward ends of said bars, my improved pole attachment is engaged.

The pole attachment consists essentially of an evener plate C, secured on the lower side of said bars, said evener plate constructed with laterally projecting arms C', C², perforated at their outer extremities and provided with perforated lugs or flanges C³. Above the evener plate and at the top of the bars B, B' is attached a pole plate D, said plate being also constructed with laterally projecting arms D', D², perforated at their outer extremities and also provided with perforated lugs or flanges C⁴. The pole plate is preferably constructed with upwardly extended side walls "$d^2$," "$d^3$." The base of said plate extending underneath the pole, there being thus formed within said upwardly projecting flanges and above the base of the plate, a socket to receive the rear end of the pole E. The pole may be engaged in the pole plate in any suitable manner.

G is the evener engaged in the evener plate in any suitable manner. Thus a strap of metal H, may be engaged underneath the pole plate between which strap and the pole plate the evener is engaged as shown.

H' is the bolt passing through the evener.

The arms C' C² of the evener and the arms D' D², of the pole plate are jointly connected at their outer extremities as by means of bolts J, passed through the coincident perforations in said arms. This construction, it will be observed, permits of the pole plate with pole attached thereto being thrown over on the arc of the circle, as indicated in dotted lines in Fig. 2. In such position the parts may be rigidly locked in place by means of bolts passed through the perforations K in the lugs C³, C⁴, upon the arms of the evener and pole plate above specified. The pole may thus be thrown over to one side of the longitudinal center of the bars B, B', to which the evener plate is secured. The object of providing for thus throwing the pole over to one side of the longitudinal center of the draft bars B, B', is to avoid side draft and the necessity of using a complicated three horse evener where three horses are desired. The use of this attaching device when the pole is thus thrown over to one side of the longitudinal center of the draft bars does not change the point of attachment to the machine and still permits the center horse to be placed directly in the longitudinal center of the machine, and afford as perfect a draft as though two or four horses were attached to the implement.

I am aware that the mere placing of the pole to the one side of the longitudinal center of the implement is not new in itself, but so far as I am aware it has always been accomplished hitherto by extra sets, brackets or other devices which are liable to be mislaid or lost, or which are liable not to fit when wanted, and which require a considerable time for their application to the machine, whenever it is desired to change from the use of two to three horses. In my present invention, however, there are no independent devices separate from those employed when the pole plate is either vertically above the evener plate or thrown to one side thereof. There are, consequently, no parts to be mislaid or lost, and the change of position can readily be made in a few minutes. This device can be used on any kind of a machine or vehicle where three horses are required.

What I claim as my invention is—

1. The combination with an implement of the character described, of an evener plate, a movable pole plate jointedly connected with said evener plate, and arranged to be thrown over to one side of the evener plate, substantially as set forth.

2. In an implement of the character described, an evener plate constructed with laterally extended arms, a movable pole plate constructed with laterally extended arms, the arms of said evener plate and pole plate jointedly connected at their outer ends, substantially as set forth.

3. The combination with an implement of the character described, of an evener plate, a movable pole plate hinged to the evener plate, and means to lock the pole plate in a given position, substantially as set forth.

4. The combination with an implement of the character described, of an evener plate, a movable pole plate, said plates provided with laterally extended arms, jointedly connected at their outer ends, said arms provided with perforated lugs, and bolts to engage adjacent lugs to lock the pole plate in a given position, substantially as set forth.

5. The combination with an implement of the character described, of an evener plate, a movable pole plate arranged to be swung over to one side the evener plate, and means to lock said pole plate in a given position, substantially as set forth.

6. The combination with an implement of the character described, of a pole attaching device permanently hinged to said implement, and constructed to be moved over to one side of the longitudinal center of the implement, and to be engaged in line therewith, substantially as described.

In testimony whereof I sign this specification in the presence of two witnesses.

ELIJAH A. OVENSHIRE.

Witnesses:
N. S. WRIGHT,
J. F. MILLER.